United States Patent
Moon et al.

(10) Patent No.: US 6,711,909 B2
(45) Date of Patent: Mar. 30, 2004

(54) OUTDOOR FAN CONTROL SYSTEM OF AIR CONDITIONER AND CONTROL METHOD THEREOF

(75) Inventors: Joong-Ki Moon, Seoul (KR); Young-Man Kim, Seoul (KR); Jae-Myoung Moon, Suwon (KR); Jung-Min Lee, Suwon (KR); Jong-Youb Kim, Suwon (KR); Il-Yong Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 67 days.

(21) Appl. No.: 10/019,532

(22) PCT Filed: Jan. 5, 2001

(86) PCT No.: PCT/KR01/00022
§ 371 (c)(1),
(2), (4) Date: Jan. 3, 2002

(87) PCT Pub. No.: WO01/94858
PCT Pub. Date: Dec. 13, 2001

(65) Prior Publication Data
US 2003/0084673 A1 May 8, 2003

(51) Int. Cl.[7] .......................... F25B 39/04; F25D 17/06
(52) U.S. Cl. ........................................... 62/184; 62/428
(58) Field of Search .......................... 62/184, 228.4, 62/181, 183, 228.5, 428

(56) References Cited

U.S. PATENT DOCUMENTS

| | | | | |
|---|---|---|---|---|
| 5,138,844 A | * | 8/1992 | Clanin et al. | 62/89 |
| 5,150,581 A | * | 9/1992 | Smith | 62/115 |
| 5,255,529 A | * | 10/1993 | Powell et al. | 62/180 |
| 5,605,053 A | * | 2/1997 | Otori | 62/180 |
| 5,735,134 A | * | 4/1998 | Liu et al. | 62/230 |

FOREIGN PATENT DOCUMENTS

| | | |
|---|---|---|
| KR | 98-145021 B | 4/1998 |
| KR | 2000-7337 A | 2/2000 |

* cited by examiner

*Primary Examiner*—Marc Norman
(74) *Attorney, Agent, or Firm*—Staas & Halsey LLP

(57) ABSTRACT

An outdoor unit includes a pulse width modulation compressor, an outdoor heat exchanger. First and second outdoor fans are positioned near to the outdoor heat exchanger. The operation modes of the first and second outdoor fans are determined in accordance with the amount of refrigerant discharged from the compressor and external conditions. An outdoor temperature sensor is electrically connected to the input port of the outdoor control unit, and first and second outdoor fan operating units for respectively operating first and second outdoor fans are connected to the output port of the outdoor control unit. The outdoor control unit operates the first and second fans in a preset operation mode by confirming outdoor temperature data input from the outdoor temperature sensor and the loading time of the compressor and controlling the first and second outdoor fan operating units.

10 Claims, 6 Drawing Sheets

OUTDOOR FAN CONTROL SYSTEM OF AIR CONDITIONER AND CONTROL METHOD THEREOF

TECHNICAL FIELD

The present invention relates generally to air conditioners, and more particularly to a system and method for controlling the outdoor fan of an air conditioner that employs a pulse width modulated compressor.

BACKGROUND ART

In an air conditioner, a condenser, that is, an outdoor side heat exchanger, is mounted on an outdoor unit, and serves to condense refrigerant by heat transfer to its surroundings. In such a case, the amount of heat exchange in the outdoor side heat exchanger varies with the rotational speed of a fan and an outdoor temperature. The variation in the amount of heat exchange directly affects the cooling capacity of an indoor unit.

The difference between the temperatures of refrigerant and the outdoor air is large when the outdoor temperature is relatively low, so the amount of heat exchange in the outdoor side heat exchanger is increased. Consequently, there is a concern that the evaporation temperature of refrigerant in an evaporator, that is, an indoor side heat exchanger, is decreased, and the surface of the indoor side heat exchanger may freeze. In such a case, the cooling capacity of the indoor unit is decreased.

On the other hand, the difference between the temperatures of refrigerant and the outdoor air is small when the outdoor temperature is relatively high, so the amount of heat exchange in the outdoor side heat exchanger is decreased. Consequently, the evaporation temperature of refrigerant in the indoor side heat exchanger is increased, and the amount of heat exchange of refrigerant is decreased, so the cooling capacity of the indoor unit is decreased.

Hence, in order to keep the cooling capacity of the indoor unit optimal regardless of outdoor temperature, it is necessary to properly regulate the amount of heat exchange in the outdoor side heat exchanger according to variations in outdoor temperature.

To this end, in a conventional air conditioner, the rotational speed of an outdoor fan is regulated to high speed or low speed according to outdoor temperature. This regulation is performed for not only an air conditioner having a single outdoor fan but also an air conditioner having a plurality of outdoor fans. That is, when an outdoor temperature is low, a plurality of outdoor fans are simultaneously operated at a low speed so as to reduce the amount of heat exchange in an outdoor side heat exchanger; when an outdoor temperature is high, the outdoor fans are simultaneously operated at a high speed so as to increase the amount of heat exchange in the outdoor side heat exchanger.

However, the above-described conventional method for controlling the outdoor fan of an air conditioner is problematic in that when the amount of compression and discharge of refrigerant varies with time as is the case when an inverter compressor or a pulse width modulated compressor is used, the amount of heat exchange in an outdoor side heat exchanger cannot be held constant because the outdoor fan is regulated based only on the outdoor temperature.

In particular, for a pulse width modulated compressor, the discharge of refrigerant is periodically or intermittently carried out during the operation of the compressor. That is, a loading time, during which refrigerant is discharged, and an unloading time, during which refrigerant is not discharged are alternated, so the amounts of compression and discharge of refrigerant vary with time, thereby varying the amount of refrigerant flowing through an outdoor side heat exchanger. That is, when the loading time is relatively short, the amount of refrigerant flowing through the outdoor side heat exchanger is relatively small. In this case, when the rotational speed of the outdoor fan is constant, a relatively excessive heat exchange is conducted in view of the amount of refrigerant flowing through the outdoor side heat exchanger. Accordingly, the cooling capacity of the indoor unit is increased due to the supercooling of refrigerant in the outdoor heat exchanger. On the other hand, when the loading time is relatively long, the amount of refrigerant flowing through the outdoor side heat exchanger is relatively large. In this case, when the rotational speed of the outdoor fan is constant, a relatively insufficient heat exchange is conducted in view of the amount of refrigerant flowing through the outdoor side heat exchanger. Accordingly, the cooling capacity of the indoor unit is decreased due to an increase in the condensation pressure of refrigerant in the outdoor heat exchanger.

DISCLOSURE OF THE INVENTION

Accordingly, the present invention has been made keeping in mind the above problems occurring in the prior art, and an object of the present invention is to provide a system and method for controlling the outdoor fan of an air conditioner employing an pulse width modulated compressor, in which the amount of heat exchange in the outdoor heat exchange of the air conditioner is properly regulated, thereby allowing the indoor unit of the air conditioner to have a proper cooling capacity.

In order to accomplish the above object, an aspect of the principles of the present invention, a system for controlling the outdoor fan of an air conditioner comprises a compressor in which the amount of discharge of refrigerant is variable during its operation; an outdoor heat exchanger connected to said compressor; an outdoor fan(s) positioned near said outdoor heat exchanger; an outdoor temperature sensor for sensing outdoor temperature; and a control unit for controlling said outdoor fan(s) to be operated in one of preset operation modes according to an outdoor temperature sensed by said outdoor temperature sensor and the amount of discharge of refrigerant of said compressor.

Further, according to another aspect of the principles of the present invention, a method for controlling the outdoor fan(s) of an air conditioner having a compressor controlled in a pulse width modulation manner comprises detecting an outdoor temperature; detecting a loading time of said compressor; and operating said outdoor fan(s) in one of preset operation modes according to a detected outdoor temperature and a detected loading time of said compressor.

Figure 1:
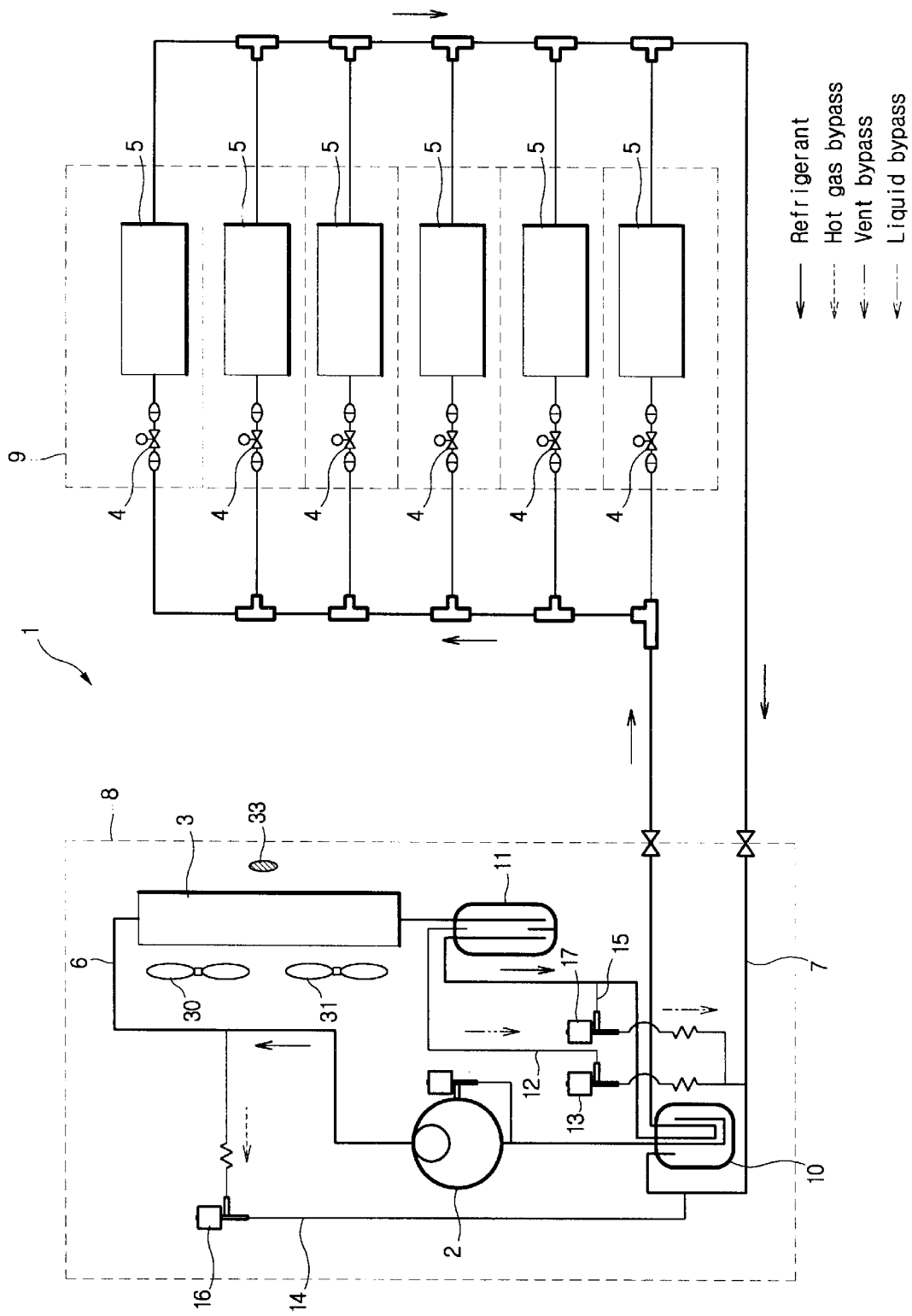
FIG. 1 is a diagram showing the cycle of a system for controlling the outdoor fans of an air conditioner in accordance with the present invention.

*Description of reference characters of principal parts

| | |
|---|---|
| 2: compressor | 5: indoor heat exchanger |
| 8: outdoor unit | 9: indoor unit |
| 26: pulse width modulated valve | 27: outdoor control unit |
| 28: outdoor communication circuit unit | 29: indoor control unit |
| 30: first outdoor fan | 31: second outdoor fan |
| 33: outdoor temperature sensor | |

BEST MODE FOR CARRYING OUT THE INVENTION

Hereinafter, embodiments of the present invention are described in detail with reference to accompanying drawings.

FIG. 1 is a diagram showing the cycle of a system for controlling the outdoor fans of an embodiment of the air conditioner in accordance with the present invention. The air conditioner 1 includes a compressor 2, an outdoor heat exchanger 3, a plurality of electronic expansion valves 4, and a plurality of indoor heat exchangers 5, which are connected to each other by refrigerant conduits to form a closed refrigeration circuit. Of the refrigerant conduits, a refrigerant conduit connecting the outflow side of the compressor 2 to the inflow side of the electronic expansion valves 4 is a high pressure conduit 6 for guiding the flow of high pressure refrigerant discharged from the compressor 2, while a refrigerant conduit connecting the outflow side of the electronic expansion valves 4 to the inflow side of the compressor 2 is a low pressure conduit 7 for guiding the flow of low pressure refrigerant expanded in the electronic expansion valves 4. The outdoor heat exchanger 3 is situated on the high pressure conduit 6, while the indoor heat exchangers 5 are situated on the low pressure conduit 7. While the compressor 2 is operated, refrigerant flows in the directions indicated by solid arrows.

The air conditioner 1 of includes an outdoor unit 8 and a plurality of indoor units 9. The outdoor unit 8 includes the above-described compressor 2 and the above-described outdoor heat exchanger 3. The outdoor unit 8 further includes an accumulator 10 situated on the low pressure conduit 7 upstream of the compressor 2 and a receiver 11 situated on the high pressure conduit 6 downstream of the outdoor heat exchanger 3. The accumulator 10 serves to collect and evaporate liquid refrigerant having not been evaporated and allow evaporated refrigerant to flow into the compressor 2. If refrigerant is not evaporated completely in the indoor heat exchangers 5, refrigerant entering the accumulator 10 is a mixture of liquid refrigerant and gaseous refrigerant. The accumulator 10 evaporates liquid refrigerant, and allows only gaseous refrigerant (refrigerant gas) to enter the compressor 2. To this end, it is desirable to situate the entrance and exit ends of the refrigerant conduit situated inside of the accumulator 10 in the upper portion of the accumulator 10.

Likewise, if refrigerant is not condensed completely in the outdoor heat exchanger 3, refrigerant entering the receiver 11 is a mixture of liquid refrigerant and gaseous refrigerant. The receiver 11 is constructed to separate the liquid refrigerant and the gaseous refrigerant from each other and to allow only the liquid refrigerant to be discharged. To this end, the entrance and exit ends of the refrigerant conduit situated inside of the receiver 11 are extended to the lower portion of the receiver 11.

In order to bypass gaseous refrigerant situated in the receiver 11, a vent bypass conduit 12 is provided to connect the receiver 11 to the low pressure conduit 7 upstream of the accumulator 10. The entrance end of the vent bypass conduit 12 is situated in the upper portion of the receiver 11, so only gaseous refrigerant enters the vent bypass conduit 12. A vent valve 13 is provided on the vent bypass conduit 12 and controls the flow rate of gaseous refrigerant bypassed. Accordingly, the gaseous refrigerant collected in the receiver 11 flows in the directions of double dotted arrows by the action of the vent valve 13.

The portion of the high pressure conduit 6 extended from the receiver 11 is constructed to pass through the accumulator 10. This construction is to evaporate the liquid refrigerant of low temperature collected in the accumulator 10 by using the refrigerant of relatively high temperature passing through the high pressure conduit 6. In order to effectively evaporate the refrigerant, the portion of the low pressure conduit 7 situated in the accumulator 10 is formed in the shape of U, while the portion of the high pressure conduit 6 passing through the accumulator 10 is positioned to pass through the interior of the U-shaped portion of the low pressure conduit 7.

The outdoor unit 8 further includes a hot gas bypass conduit 14 connecting the portion of the high pressure conduit 6 between the compressor 2 and the outdoor heat exchanger 3 to the accumulator 10, and a liquid bypass conduit 15 connecting the downstream side of the receiver 11 and the upstream side of the accumulator 10. A hot gas valve 16 is situated on the hot gas bypass conduit 16 to control the flow rate of hot gas bypassed, and a liquid valve 17 is situated on the liquid bypass conduit 15 to control the flow rate of liquid refrigerant bypassed. Accordingly, when the hot gas valve 16 is opened, a portion of hot gas discharged from the compressor 2 flows along the hot gas bypass conduit 14 in the direction indicated by the dotted arrow of FIG. 1; when the liquid valve 17 is opened, a portion of liquid refrigerant discharged from the receiver 11 flows along the liquid bypass conduit 15 in the direction indicated by the double dotted arrow of FIG. 1.

The outdoor unit 8 further includes first and second outdoor fans 30 and 31 positioned near the outdoor heat exchanger 3. The first and second outdoor fans 30 and 31 are positioned side by side and allow external air to pass through the outdoor heat exchanger 3, so heat exchange can occur in the outdoor heat exchanger 3. The operation mode of the first and second outdoor fans 30 and 31 are determined according to the amount of refrigerant discharged from the compressor 2 and external conditions as will be described in more detail later. Additionally, the outdoor unit 8 further includes an outdoor temperature sensor 33 for measuring outdoor temperature.

A plurality of indoor units 9 are arranged in parallel. Each of the indoor units 9 includes an electronic expansion valve 4 and an indoor heat exchanger 5. Consequently, a plurality of indoor units 9 are connected to a single outdoor unit 8. The capacities and shapes of indoor units may be identical with or different from one another.

Figure 2A:
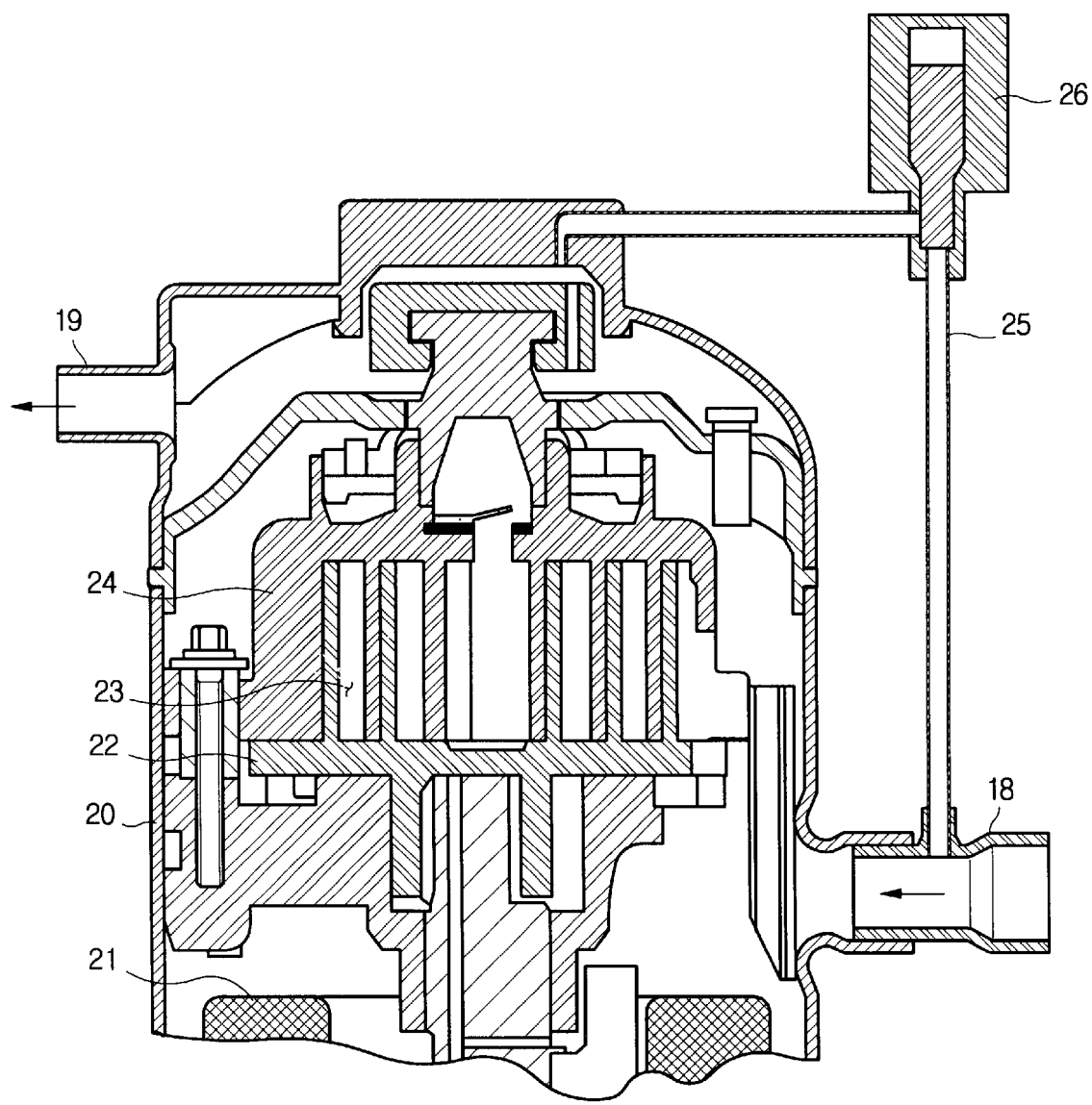
FIG. 2a is a sectional view showing a pulse width modulated compressor at a loading position.
Figure 2B:
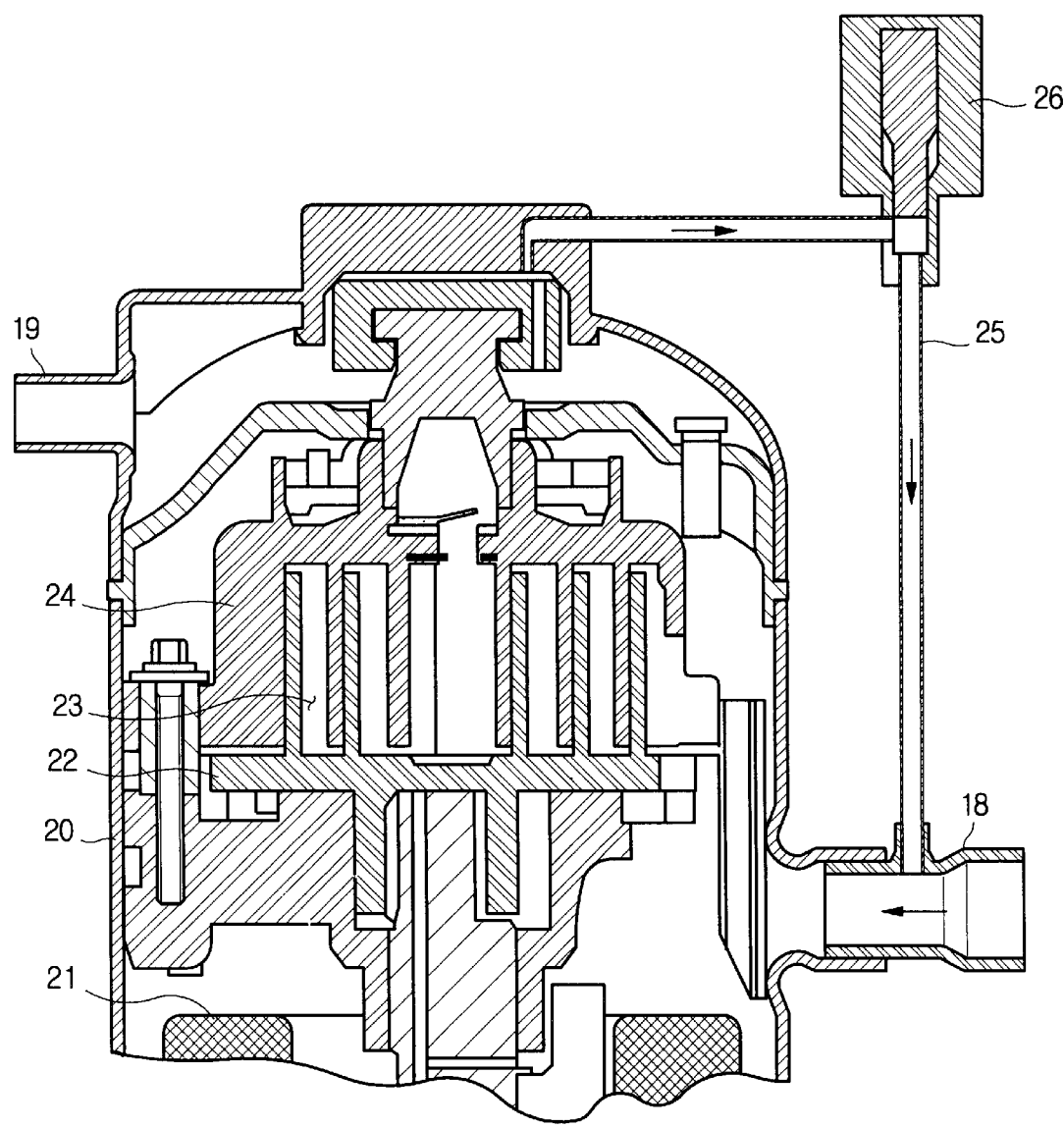
FIG. 2b is a sectional view showing the pulse width modulated compressor at an unloading position.

As depicted in FIGS. 2a and 2b, a variable capacity compressor controlled in a pulse width modulation manner is employed as a compressor 2. The compressor 2 includes a casing 20 provided with an inlet 18 and an outlet 19, a motor 21 situated in the casing 20, a rotating scroll 22 rotated by the rotating force of the motor 21, and a stationary scroll 24 defining a compressing chamber 23 together with the rotating scroll 22. A bypass conduit 25 is attached to the casing 20 to connect a position over the stationary scroll 24 to the inlet 18, and a PWM valve (Pulse Width Modulated Valve) 26 in the form of a solenoid valve is mounted on the bypass conduit 25. In FIG. 2a, the PWM valve 26 is OFF and closes the bypass conduit 25. In this state, the compressor 2 discharges refrigerant. This state is referred to as "a loading state", and in this state the compressor 2 is operated at 100% capacity. In FIG. 2b, the PWM valve 26 is ON and opens the bypass conduit 25. In this state, the compressor 2 does not discharge refrigerant. This state is referred to as "an unloading state", and in this state the compressor 2 is operated at 0% capacity. Power is supplied to the compressor 2 regardless of the loading and unloading states, and the motor 21 is rotated at a constant speed. When power is not supplied to the compressor 2, the motor 21 is not rotated and the compressor 2 is not operated.

Figure 3:
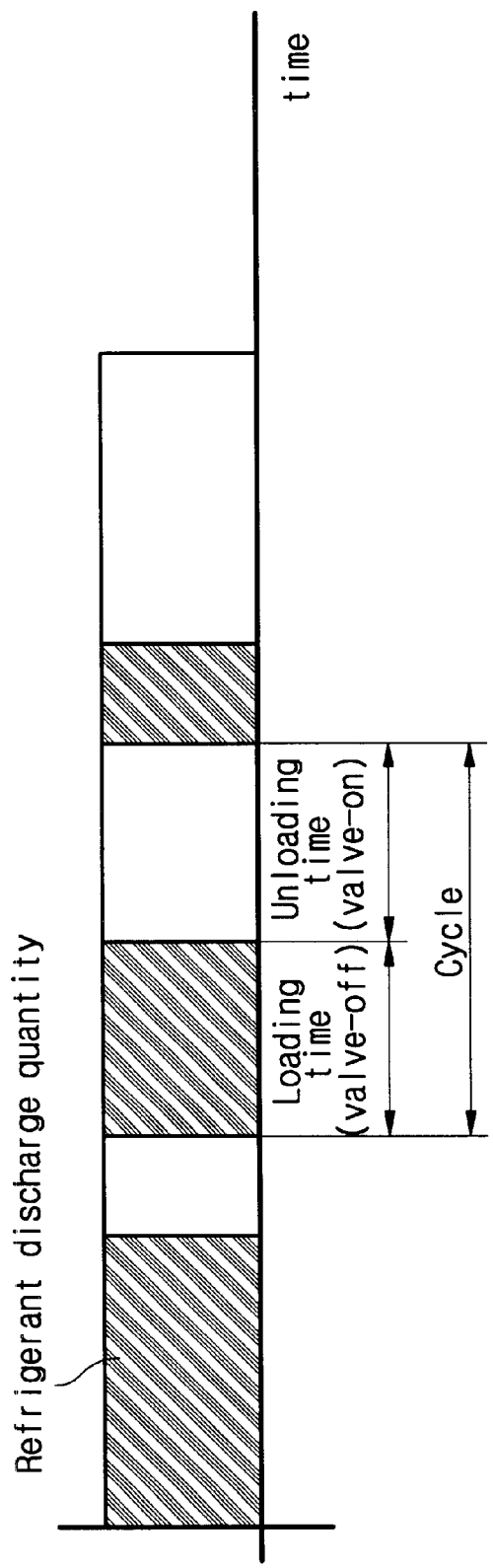
FIG. 3 is a graph showing a relationship among the loading time and the unloading time and the amount of discharged refrigerant during the operation of the compressor of FIGS. 2a and 2b.

As shown in FIG. 3, the compressor 2 periodically undergoes the loading and unloading states during its operation. The loading time and the unloading time vary according to required cooling capacity. During the loading time the temperature of the indoor heat exchanger 5 is decreased because the compressor 2 discharges refrigerant, while during the unloading time the temperature of the indoor heat exchanger 5 is increased because the compressor 2 does not discharge refrigerant. In FIG. 3, the hatched portions indicate the amount of discharged refrigerant. A signal for controlling the loading time and the unloading time is referred to as a duty control signal. In an embodiments of the present invention, the capacity of the compressor 2 is varied in such a way that the loading time and the unloading time are varied according to the required total cooling capacity of the compressor 2 while each cycle period is kept constant, for example, at twenty seconds.

Figure 4:
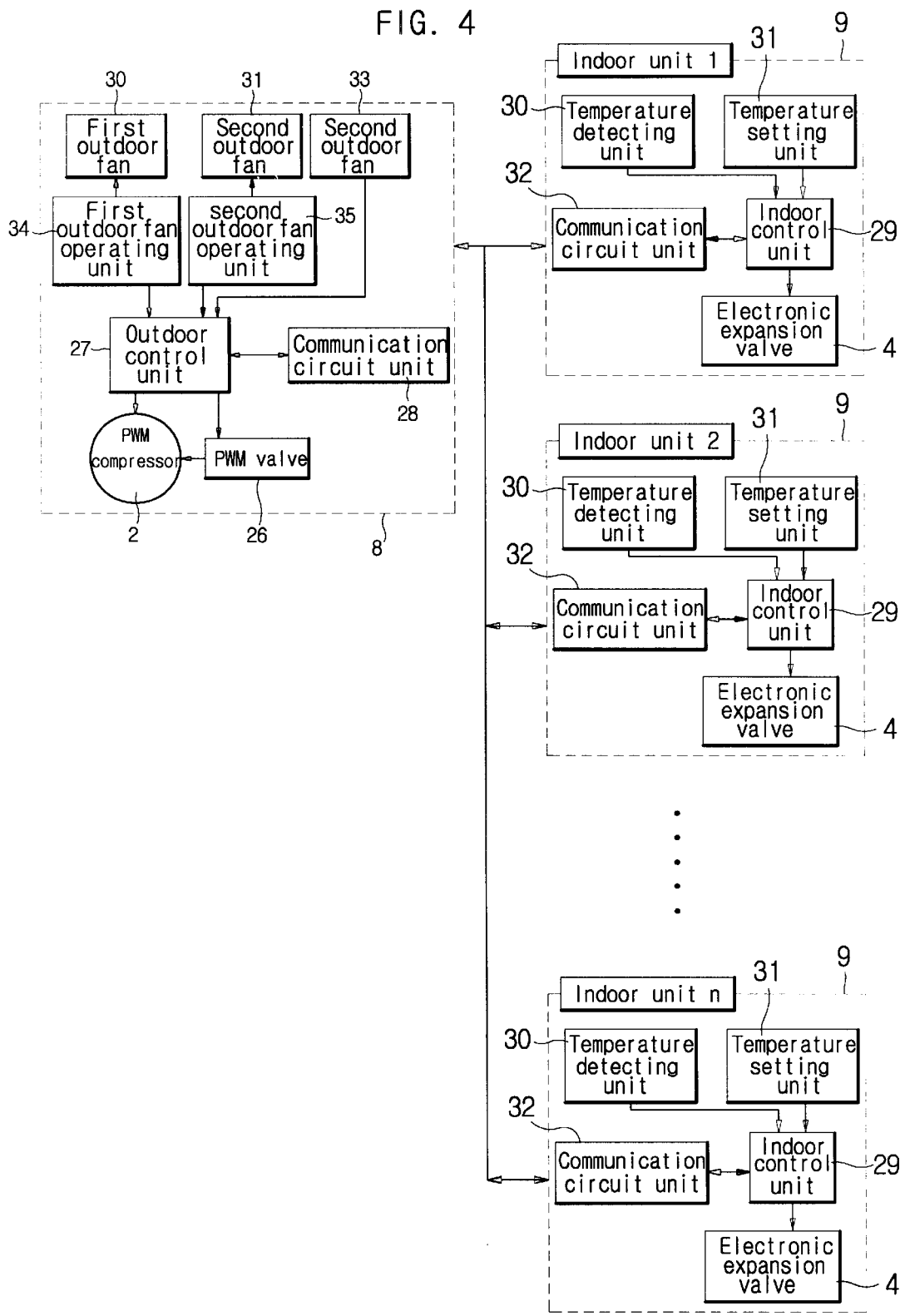
FIG. 4 is a block diagram showing the system for controlling the outdoor fans of an air conditioner in accordance with the present invention.

FIG. 4 is a block diagram showing the system for controlling the outdoor fans of an air conditioner in accordance with the present invention. As illustrated in FIG. 4, the outdoor unit 8 includes an outdoor control unit 27 that is connected to, and controls the compressor 2 and the PWM valve 26. The outdoor control unit 27 is connected to an outdoor communication circuit unit 28 to transmit and receive data. Additionally, an outdoor temperature sensor 33 is connected to the input port of the outdoor control unit 27, and first and second outdoor fan operating units 34 and 35 for operating first and second outdoor fans 30 and 31 respectively, are connected to the output port of the outdoor control unit 27. The outdoor control unit 27 operates the first and second fans 30 and 31 in a preset operation mode by confirming outdoor temperature data inputted from the outdoor temperature sensor 33 and the loading time of the compressor 2, and by controlling the first and second outdoor fan operating units 34 and 35.

Each of the indoor units 9 includes an indoor communication circuit unit 32 connected to an indoor control unit 29 and the outdoor unit 8 to transmit and receive data. The outdoor communication circuit unit 28 and the indoor communication circuit unit 32 may be constructed to transmit and receive data in a wire or wireless fashion. A temperature detecting unit 30 and a temperature setting unit 31 are connected to the input port of the indoor control unit 29, and the electronic expansion valve 4 is connected to the output port of the indoor control unit 29. The temperature detecting unit 30 is a temperature sensor for sensing the temperature of a room to be air-conditioned. The indoor control unit 29 receives signals from the temperature detecting unit 30 and the temperature setting unit 31 and calculates the required cooling capacity of the indoor unit 9 on the basis of the difference between an indoor temperature and a set temperature. The loading time of the compressor 2 is determined according to the required cooling capacity calculated by the above-described way.

The first and second outdoor fans 30 and 31 each have three operation modes of stop, low speed and high speed modes. Exemplary operation modes determined by the combination of the two outdoor fans 30 and 31 are shown in the following table.

TABLE 1

| Mode | First outdoor fan | Second outdoor fan |
|------|-------------------|--------------------|
| 5 | high speed | high speed |
| 4 | low speed | high speed |
| 3 | low speed | low speed |
| 2 | stop | high speed |
| 1 | stop | low speed |
| 0 | stop | stop |

That is, the number of operation modes determined by the combination of two outdoor fans are six. Although two fans are utilized in this embodiment, only one fan can be utilized. In such a case, the operation modes of the fan may be three of stop, low speed and high speed modes. It should be understood and readily apparent to those skilled in the art that any number of fans, and any number of operation modes thereof may be possible.

In an embodiment, the operation modes are predetermined an outdoor temperature and the loading time of the compressor 2. Table 2 shows an exemplary operation modes according to an outdoor temperature and a loading time when a duty cycle control period for a compressor of 7.5 horsepower is twenty seconds.

TABLE 2

| | | Outdoor temperature | | | | |
|---|---|---|---|---|---|---|
| | | 7° C. or lower | 8 to 12° C. | 13 to 17° C. | 18 to 22° C. | 23 to 27° C. | 28° C. or higher |
| Loading time | 10 seconds or more | 0 | 2 | 3 | 4 | 5 | 5 |
| | 5 to 9 seconds | 0 | 1 | 2 | 3 | 4 | 5 |
| | 4 seconds or less | 0 | 0 | 1 | 2 | 3 | 5 |

As apparent from Table 2, as the outdoor temperature becomes higher and the loading time of the compressor 2 becomes longer (as the loading time of the compressor 2 is longer, the amount of discharge of refrigerant becomes larger), the operation modes are preset to allow the rotational speed of the first and second outdoor fans 30 and 31 to become higher.

Figure 5:
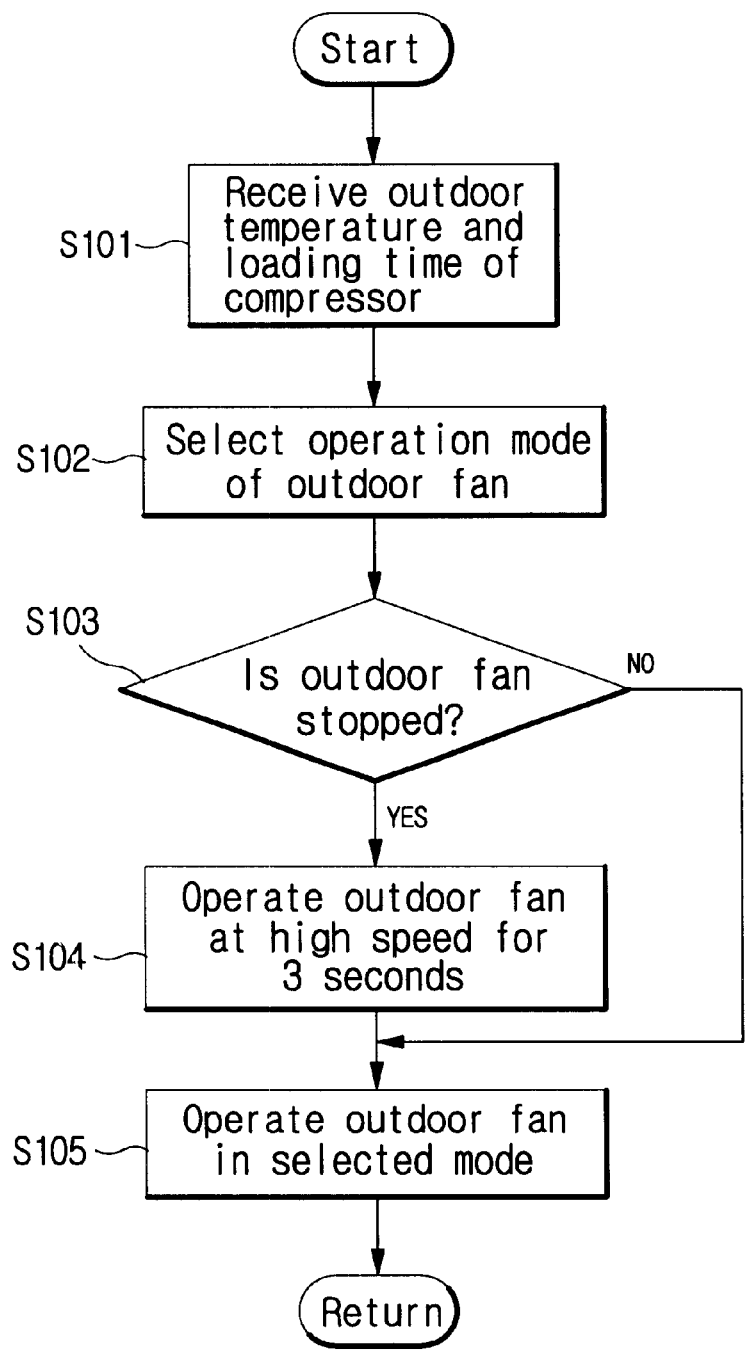
FIG. 5 is a flowchart showing a method for controlling the outdoor fans of an air conditioner in accordance with the present invention.

Referring to FIG. 5, a method for controlling the outdoor fans of an air conditioner is described. First, when the compressor 2 is started, the outdoor control unit 27 receives an outdoor temperature and the loading time of the compressor 2 (S101). The outdoor temperature sensor 33 detects an outdoor temperature, and the outdoor control unit 27 has information on the loading time of the compressor 2 when the compressor 2 is operated. Thereafter, an operation mode is selected according to the outdoor temperature and the loading time of the compressor (S102). The selection of the operation mode is made from a plurality of operation modes, e.g., from the six modes shown in Table 1 and 2.

Next, prior to the performance of a selected operation mode, it is determined whether the first and second outdoor fans 30 and 31 are stopped (S103). In a preferred embodiment, when the first and second outdoor fans 30 and 31 are stopped, the fans 30 and 31 are operated at a high speed regardless of the selected operation mode (S104). That is, when the first and second outdoor fans 30 and 31 are all stopped, the fans 30 and 31 are operated in the mode 5. This is to enhance the starting power of an outdoor fan operating motor. Such operation is continued for two to five seconds (preferably, for three seconds).

If it is determined that the outdoor fans 30 and 31 are not stopped at STEP S103, or after the operation of the outdoor fans 30 and 31 exceeds three seconds at STEP S104, the outdoor fans 30 and 31 are operated in the operation mode selected at STEP S102 (S105). For example, if the outdoor temperature is lower than 7° C., the mode 0 is selected regardless of the loading time of the compressor 2. In the mode 0, the first and second outdoor fans are all stopped. In this state, if the outdoor temperature is 15° C. and the loading time of the compressor 2 is 12 seconds, the mode 3 is selected as the operation mode according to Table 2. However, the first and second outdoor fans 30 and 31 are not operated directly in the mode 3, but they are operated in the selected mode 3 after being operated in the mode 5 for three seconds. As a result, the operation modes of the first and second outdoor fans 30 and 31 are all changed from a high speed mode to a low speed mode.

INDUSTRIAL APPLICABILITY

As described above, the present invention provides a system and method for controlling the outdoor fan of an air conditioner, in which the outdoor fan is controlled according to the loading time of a pulse width modulated compressor and an outdoor temperature, thereby properly regulating the amount of heat exchange in the outdoor heat exchanger of the air conditioner and, accordingly, allowing the indoor unit of the air conditioner to have a proper cooling capacity.

What is claimed is:

1. A method of controlling at least one outdoor fan of an air conditioner having a compressor controlled in a pulse width modulation, comprising:

detecting an outdoor temperature;

detecting a loading time of said compressor; and operating said at least one outdoor fan in one of preset operation modes according to said detected outdoor temperature and said detected loading time of said compressor.

2. The method according to claim 1, wherein as said outdoor temperature becomes higher and said loading time of said compressor becomes longer, said selected one of said preset operation modes allowing the rotational speed of said outdoor fan to become higher.

3. The method according to claim 2, wherein the operation modes of said at least one outdoor fan include stop, low speed and high speed modes, and said at least one outdoor fan is operated in selected one of said preset operation modes after having been operated in the high speed mode for a predetermined time when said at least one outdoor fan is changed from the stop mode to another operation mode.

4. The method according to claim 3, wherein said predetermined time is two to five seconds.

5. The method according to claim 1, wherein said at least one outdoor fan comprises two outdoor fans each having stop, low speed and high speed operation modes, and said operation modes for said two outdoor fans include six of stop-stop, stop-low speed, stop-high speed, low speed-low speed, low speed-high speed and high speed-high speed operation modes.

6. A system to control at least one outdoor fan of an air conditioner, comprising:

a compressor in which an amount of discharge of refrigerant is variable during its operation;

an outdoor heat exchanger connected to said compressor;

one or more outdoor fans positioned near said outdoor heat exchanger;

an outdoor temperature sensor to sense an outdoor temperature; and a control unit to control said at least one outdoor fan to be operated in one of preset operation modes according to said sensed outdoor temperature and said amount of discharge of refrigerant of said compressor, wherein, as said outdoor temperature becomes higher and a loading time of said compressor becomes longer, said selected one of said preset operation modes allowing the rotational speed of said outdoor fan to become higher.

7. The system according to claim 6, wherein said at least one outdoor fan comprises one outdoor fan, and said preset operation modes include stop, low speed and high speed modes.

8. The system according to claim 6, wherein said at least one-outdoor fan comprises two outdoor fans each having stop, low speed and high speed operation modes, and said preset operation modes for said two outdoor fans include stop-stop stop-low speed, stop-high speed, low speed-low speed, low speed-high speed and high speed-high speed operation modes.

9. The system according to claim 6, wherein said compressor and said outdoor heat exchanger constitute an outdoor unit, and said air conditioner further comprises at least one indoor unit having an electronic expansion valve and an indoor heat exchanger.

10. A system to control at least one outdoor fan of an air conditioner, comprising:

a compressor in which an amount of discharge of refrigerant is variable during its operation;

an outdoor heat exchanger connected to said compressor;

one or more outdoor fans positioned near said outdoor heat exchanger;

an outdoor temperature sensor to sense an outdoor temperature; and a control unit to control said at least one outdoor fan to be operated in one of preset operation modes according to said sensed outdoor temperature and said amount of discharge of refrigerant of said compressor, wherein, said compressor is controlled in a pulse width modulation manner and the amount of discharge of refrigerant of said compressor is determined by a loading time of said compressor.

* * * * *